(12) United States Patent
Huziwara et al.

(10) Patent No.: US 7,531,142 B2
(45) Date of Patent: May 12, 2009

(54) MULTIFUNCTIONAL ENTRY DEVICE FOR A DOWNWARD FLOW TUBE REACTOR

(75) Inventors: Wilson Kenzo Huziwara, Rio de Janeiro (BR); Waldir Pedro Martignoni, São Mateus do Sul (BR); Mauro Silva, Rio de Janeiro (BR); José Geraldo Furtado Ramos, Rio de Janeiro (BR); Aurelio Medina Dubois, Rio de Janeiro (BR); Paulo Sergio Freire, Rio de Janeiro (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 441 days.

(21) Appl. No.: 11/512,216

(22) Filed: Aug. 30, 2006

(65) Prior Publication Data

US 2006/0286009 A1     Dec. 21, 2006

Related U.S. Application Data

(63) Continuation of application No. 10/119,037, filed on Apr. 10, 2002, now abandoned.

(30) Foreign Application Priority Data

Apr. 10, 2002   (BR)   .................................... 0101433

(51) Int. Cl.
*B01J 8/18*   (2006.01)
(52) U.S. Cl. .................... 422/143; 422/145; 96/372; 366/173.2

(58) Field of Classification Search ................. 422/139, 422/143, 145; 96/372; 366/173.2
See application file for complete search history.

(56) References Cited

U.S. PATENT DOCUMENTS

| 4,338,187 | A |   | 7/1982  | Gartside et al. |
|-----------|---|---|---------|-----------------|
| 4,919,898 | A |   | 4/1990  | Gartside et al. |
| 5,160,513 | A | * | 11/1992 | Koves ............................ 95/90 |
| 5,296,131 | A |   | 3/1994  | Raterman        |

(Continued)

*Primary Examiner*—N. Bhat
(74) *Attorney, Agent, or Firm*—Nixon & Vanderhye, PC (57) ABSTRACT

A device and a method for operating it for application in a vertical tube reactor with downward flow (downer), has the aim of ensuring the intimate mixing of the solid particulate catalyst with a reagent fluid. Homogeneous distribution of catalyst is due to the use of a plate having perforations. Said perforated plate normally allows the passage of a portion of the stream of catalyst. The other portion overflows the edge of the plate, flowing in the form of an annular curtain, near the inner surface of the surrounding tube of the device. After passing beyond the perforated plate, the curtain-flow undergoes a deflection produced by an annular screen, to be mixed with the stream originating from the orifices in the perforated plate. A hydrocarbon charge is injected below the perforated plate, forming a certain angle with respect to the direction of the downward flow of catalyst, by means of inlets distributed uniformly about cross sections of the surrounding tube. After the mixing region, the diameter of the device, when smaller than the diameter of the associated tube reactor, expands slightly.

13 Claims, 4 Drawing Sheets

U.S. PATENT DOCUMENTS

| | | |
|---|---|---|
| 5,318,691 A | 6/1994 | Muldowney |
| 5,344,554 A | 9/1994 | Pontier et al. |
| 5,468,369 A | 11/1995 | Muldowney |
| 6,099,720 A | 8/2000 | Pontier et al. |
| 6,186,658 B1 * | 2/2001 | Nishida et al. ........... 366/173.2 |
| 6,936,227 B1 * | 8/2005 | De Souza et al. ........... 422/140 |
| 7,087,154 B2 | 8/2006 | Pinho et al. |
| 2004/0124124 A1 | 7/2004 | Pinho et al. |

* cited by examiner

SECTION "A-A"

FIGURE 4

SECTION "B-B"

FIGURE 5

MULTIFUNCTIONAL ENTRY DEVICE FOR A DOWNWARD FLOW TUBE REACTOR

CROSS-REFERENCES TO RELATED APPLICATIONS

This application is a continuation of U.S. application Ser. No. 10/119,037, filed Apr. 10, 2002, now abandoned the entire content of which is incorporated by reference in this application.

FIELD OF THE INVENTION

The present invention relates to the area of petroleum refining.

More specifically, the field of application of the invention is reactors used in fluid catalytic cracking (FCC) processes or other processes which make use of solid particulate catalyst.

More particularly still, the invention relates to a device and to a method for supplying and homogeneously distributing solid particulate catalyst and for intimately mixing it with a reagent fluid, for application in a tube reactor with downward flow (downer).

BACKGROUND OF THE INVENTION

A fluid catalytic cracking (FCC) process aims to convert hydrocarbons with a high boiling point into lighter hydrocarbon fractions, such as gasoline and liquefied petroleum gas (LPG), inter alia.

Generally, the reactor used in a FCC process is of the tube type, with upward vertical flow, known in the technical literature as a riser type reactor. Such a reactor uses a solid catalyst consisting basically of a powder of fine particle size which, normally preheated, is introduced into the reactor. Upon entry into the reactor, in its lower portion, the catalyst is preaccelerated with vapor and intimately mixed with a preheated, sprayed hydrocarbon charge. After the so-called mixing region, the resulting mixture of vaporized hydrocarbon and catalyst continues to react, converting, during the upward vertical flow through the tube reactor, heavy hydrocarbon fractions with high boiling points into light hydrocarbon fractions with low boiling points.

As an alternative to the tube reactor with upward vertical flow, for converting heavy hydrocarbons into light hydrocarbon fractions, it is possible to use a tube reactor with downward vertical flow, also known in the technical literature as a downer or dropper type reactor.

A downer reactor offers certain technical and financial advantages when compared with the riser reactor, such as: increased conversion to products with greater added value, such as gasoline or liquefied petroleum gas, owing to the maintenance of a more intimate contact between the catalyst and the vaporized reagent charge during the downward vertical flow through the tube reactor; less generation of light gases, allowing a reduction in the gas-treatment and compression system; less generation of coke, giving rise to a reduction in the system for regeneration of the catalyst, in which the coke deposited during the passage of the catalyst through the tube reactor is burnt. The intimate mixing of the heavy hydrocarbon charge with a high boiling point with the catalyst at high temperature is a critical stage in the fluid catalytic cracking process. An intimate contact between the charge and the catalyst is very important in order to achieve satisfactory mixing and rapid vaporization thereof. Upon entry into the mixing region, the charge is sprayed in the form of small droplets by means of the use of injector inlets.

In tube reactors with upward vertical flow (risers), the production of an intimate mixture is promoted through the action of the force of gravity on the catalyst, leading to the occurrence of reflux of catalyst in the region where the hydrocarbon charge is injected. This does not occur in tube reactors with downward vertical flow, in which the force of gravity does not promote the existence of catalyst reflux in the charge-injection region. Therefore, in downer-type reactors, the production of a mixture which is as intimate and as homogeneous as possible, at the site where the catalyst encounters the hydrocarbon charge, is highly desirable.

After the stage of mixing the catalyst at high temperature with the sprayed heavy hydrocarbon charge, the resulting mixture continues to react throughout the flow through the tube reactor. During travel, it is important for the catalyst to continue to be mixed homogeneously and intimately with the hydrocarbon charge so as to allow the occurrence of catalytic cracking reactions in preference to thermal cracking reactions. It is in this stage that the downer-type reactor offers advantages over the rise-type reactor, by virtue of the fact that there is less segregation of the stream of catalyst from the stream of hydrocarbon. Thus, these characteristics prove that, for downer-type reactors, it is important to obtain the best mixture possible, which also depends on a homogeneous spatial distribution of the catalyst, even in the stage of supplying the catalyst.

This invention relates to an entry device for downer-type reactors which is designed to allow the occurrence of an intimate and homogeneous mixing of the catalyst, in the form of heated solid particles, with the sprayed hydrocarbon charge, giving rise to rapid vaporization of the charge. In addition, the device enhances maintenance of the homogeneity of the mixture, minimizing segregation between the charge and catalyst after the stream of fluid has left the mixing region and during its flow through a downward tube reactor.

STATE OF THE ART

Means or devices are known for supplying catalysts in fluid catalytic cracking tube reactors.

U.S. Pat. No. 4,338,187 discloses a device and a process for intimately mixing a hydrocarbon charge, in vapor or liquid phase, with solid particles of heated catalyst, which occurs in the final portion of one or more entry conduits of one or more mixing chambers. The hydrocarbon charge is injected, forming a certain angle with respect to the direction of flow of the catalyst. However, the performance of the device depends on the number of mixing chambers, which has to be high so that a good distribution of catalyst and hydrocarbon is obtained throughout the transverse section of a tube reactor. If the number is insufficient, segregation will occur between the streams of hydrocarbon and of catalyst. Another problem with the disclosure of this patent is the need for control of the catalyst volume, which is based on the pressure differential between the catalyst reservoir and the mixing chamber.

U.S. Pat. No. 4,919,898 relates to a device for catalytic cracking with heated solid particles, in which a curtain of particles is introduced into a reactor via peripheral apertures and a hydrocarbon charge is introduced into the reactor at an angle through the curtain of solid particles. In this patent, use is made of a single mixing chamber. Vapor or gas is injected, at an angle of 45° below the horizontal, in order to preaccelerate the catalyst. Use is made of a stationary plug, with a spherical format, in order to give a shape to the catalyst curtain, which is supplied via the periphery of the plug. The charge is injected upwardly in a direction against the flow of the catalyst and against the spherical stationary plug, so as to form an angle which can vary between 0° and 30° with respect to the horizontal. After the charge-injection region, the mixture of catalyst and charge flows to the centre of the downward flow tube reactor where, by virtue of the collisions of the peripheral streams directed by the spherical plug, it is anticipated that there will be a satisfactory distribution of the mixture in the transverse section of the reactor. However, U.S. Pat. No. 4,919,898 concentrates on the mixing of catalyst with the hydrocarbon charge, and there is no guarantee as to the non-occurrence of segregation of the stream of catalyst from the stream of hydrocarbon after exit from the mixing chamber. Another critical aspect of that patent is the control of the volume of catalyst on the basis of the pressure differential between the reservoir of catalyst and the mixing chamber, which is not greatly recommended from the operational standpoint.

U.S. Pat. No. 5,296,131 discloses a cracking process which is characterized in that it is based on a short contact time. As regards mixing, a downward annular curtain of regenerated catalyst, or of heated inert solids, is formed over a valve of plug type, in the form of a cone, for controlling the catalyst. The hydrocarbon charge is injected via inlets installed in the conical plug of the control valve and inlets installed in the conical seat of said valve, against the solids curtain. Actually, the performance of the device is affected by the geometrical interference of the shaft and of the plug of the valve installed inside the tube reactor, which will lead to segregation of the mixture of the stream of catalyst from the stream of hydrocarbon.

U.S. Pat. No. 5,344,554 makes use of a vapor- or gas-injection ring installed below the catalyst-supply point, with the aim of distributing and adjusting the density and velocity of the stream of catalyst within acceptable values prior to the injection of the hydrocarbon charge. Injection takes place through radial inlets forming an angle with the horizontal, which provides the stream with a velocity component in the direction of the flow. The redistribution ring, in the form proposed by this patent, does not guarantee satisfactory distribution of catalyst over the entire transverse section of the tube reactor; the use of charge-injection inlets forming an angle with the horizontal and with a component in the direction of the flow, i.e. in the downward vertical direction, does not permit the maintenance of a satisfactory distribution of the catalyst since the greater force component, owing to the inherent weight and to the velocity of the catalyst, is also in this direction.

U.S. Pat. No. 5,468,369 makes use of the conditions favorable to mixing of the stream of catalyst with the stream of hydrocarbon, which is characteristic of vertical tube reactors with upward flow (risers) and takes advantage of the characteristic of maintenance, with less segregation, of the satisfactory conditions of mixing of catalyst and hydrocarbon which is offered by vertical reactors with downward flow (downers).

U.S. Pat. No. 6,099,720 has a region for mixing of the catalyst with the hydrocarbon charge which is similar to that advocated by U.S. Pat. No. 5,296,131, except that in U.S. Pat. No. 6,099,720, there is no valve shaft installed inside the tube reactor. Therefore, this is not an annular tube reactor, and there are likewise no comments as to the way in which such a valve shaft would be installed.

OBJECT OF THE INVENTION

The present invention relates to a device and to the respective method of use, for application in the entry region of a vertical tube reactor with downward flow (downer), the aim being the homogeneous distribution of solid particulate catalyst inside a mixing chamber with a view to its intimate mixing with a reagent fluid in liquid or gaseous phase.

A further object of the invention is to maintain the homogeneity of the mixture during its downward travel to the reaction region of a downward vertical tube reactor.

It is a further object of the invention to facilitate maintenance of the satisfactory mixing conditions throughout the reaction zones of a downward tube reactor.

A yet further object of the invention is to offer a method for supplying, homogeneously distributing and intimately mixing the catalyst with a sprayed hydrocarbon charge and for maintaining adequate mixing conditions during the flow of the mixture towards the reaction zones of a downer reactor.

BRIEF SUMMARY OF THE INVENTION

Accordingly, the present invention provides a device and a method for supplying a downer reactor with catalyst, flowing out from a control valve, which is directed to a collector/distributor vessel whose bottom has uniformly distributed through-holes. Said holes normally allow the passage of a portion of the stream. The portion of the stream of catalyst which does not pass through the holes, which depends on the amount of catalyst released by the valve, uniformly overflows via the upper edges of the collector/distributor vessel in the form of an annular curtain which, after passing beyond the lower edge of the collector/distributor vessel, enters the so-called mixing region with an angular component towards the longitudinal axis of the device.

Suitable conditions for distribution of catalyst are obtained through combined effects of flow through the perforated plate, of flow in the form of an annular curtain formed by overflowing from the perforated plate, and through the use of a surrounding tube with a diameter which is smaller than that of the associated downer reactor.

In order to improve the conditions of distribution of catalyst and to prevent the presence of hydrocarbon charge in the upper region of the device, which would give rise to undesirable coking, in the region between the entry valve and the collector/distributor vessel vapor may be injected by means of injector nozzles or by means of a ring. A further option, for improving the distribution of catalyst, is the use of a fluidization ring, inside the collector/distributor vessel, via which vapor is injected. Both options mentioned above may be used simultaneously.

In the mixing region at a certain distance below the catalyst-collector/-distributor vessel the hydrocarbon charge is injected via a set of inlets. These injection inlets are distributed, preferably uniformly, over the periphery of the mixing region It is possible to use one or more levels of inlets whose angle with respect to the horizontal may vary between −30° and +30° in the direction of, or against, the direction of the downward flow of catalyst.

After the mixing region, the diameter of the device expands slightly up to the diameter of the upper part of the associated tube reactor, with a taper half angle of 0° to 4°, preferably from 2° to 4°, with respect to the vertical so that there is no segregation of the stream of catalyst from the reagent hydrocarbon stream.

DETAILED DESCRIPTION OF THE INVENTION

To enhance comprehension the invention will be described with reference to the accompanying drawings. However, the Figures diagrammatically illustrate merely variants of preferred embodiments of the invention and therefore are non-limiting in nature. The inventive concept to be described below having been obeyed, it will be obvious to those skilled in the art that it is possible to use other arrangements, complementary devices or modifications to the component design, within the scope of the invention as claimed herein.

The invention presents an entry device for use in downer-type vertical reactors for catalyst/hydrocarbon-charge ratios preferably in the range from 6 to 8, but the ratio may be below or above this range. A typical application would be, for example, in a unit processing from 5000 to 10000 m$^3$/day of gas oil or atmospheric residue (bottom product of the petroleum or crude-oil atmospheric distillation tower).

Two preferred embodiments of the invention and the design of one prototype are shown in FIGS. 1 to 5.

Figure 1:
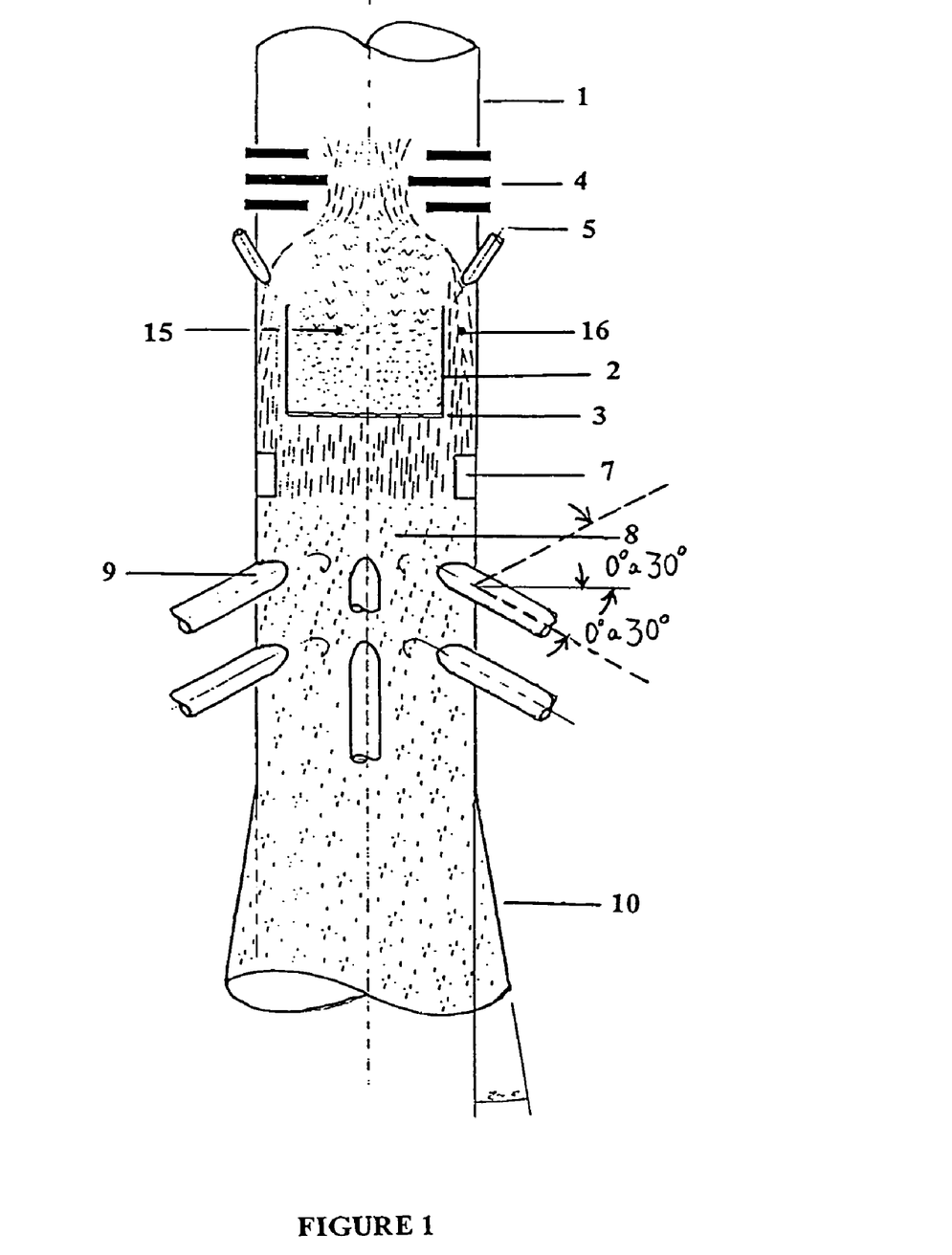
FIG. 1 shows a diagrammatic longitudinal section through a preferred embodiment of the invention.

FIG. 1 shows a diagrammatic longitudinal section, where the principal internal components can be seen, taken through a preferred embodiment of the invention.

This embodiment of the invention consists basically of a predominantly cylindrical surrounding tube 1, preferably having a small diameter in comparison with the nominal diameter of the reactor to which it will be coupled. Downstream of the coupling, the diameter of the lower portion 10 of the surrounding tube 1 expands slightly up to the diameter of the corresponding section of the reactor. Said surrounding tube 1, being connected axially and longitudinally to a downward flow tube reactor (downer), together with its internal components, will constitute the upper portion of this reactor.

The invention is equipped with means for: controlling the catalyst supply; homogeneously distributing the catalyst; intimately mixing the catalyst with a sprayed and/or vaporized hydrocarbon charge; maintaining the mixture under suitable conditions after the mixing region along the remainder of the downward path.

In its upper portion, the device of the invention has a valve 4 for controlling the supply of catalyst 15. This valve 4 may be any of the types normally used in riser-type reactors. It may also, for example, be (i) of the plug type or (ii) of the simple displacement slide type, associated with a mechanism for redirecting the catalyst to the centre of the downer-type reactor. Preferably, it may be of the dual displacement slide type, which makes it unnecessary to use the mechanism for redirecting the catalyst to the centre of the downer.

A predominantly cylindrical catalyst collector/distributor vessel 2, mounted axially and longitudinally below the control valve 4, has in its bottom wall 3 preferably circular perforations which are homogeneously distributed with the aim of receiving and distributing the catalyst 15 homogeneously throughout the transverse section of the surrounding tube 1, in the portion thereof below the collector/distributor vessel 2. The size of the holes is defined as a function of the catalyst/charge ratio, or rather of the flow rate of catalyst.

The sum of the areas of the holes is a percentage of the area of the transverse section of the so-called mixing region 8, of the device of the invention located below the collector/distributor vessel 2. This percentage varies from 22% to 55%, preferably from 30% to 40%, of the area of the transverse section of the mixing region 8. Said holes normally allow the passage of a portion of the stream. That portion of the stream of catalyst 15 which does not pass through the holes, which depends on the amount of catalyst 15 released by the valve 4 per unit of time, uniformly flows over the upper edges of the collector/distributor vessel 2 which act as a weir. Therefore, depending on the supply rate, i.e. the catalyst/hydrocarbon-charge ratio of the process, the catalyst 15 will accumulate in the collector/distributor vessel 2 and will be able to pass over its upper edge. In such a case, the catalyst forms a small mound which is preferably symmetrical and, over and above a certain height, overflows and flows via the outer part of the collector/distributor vessel 2 along the annular space between said vessel 2 and the surrounding tube 1, forming a type of curtain 16.

On the lateral surface of the portion of the surrounding tube 1, between the control valve 4 and the catalyst-collector/-distributor vessel 2, are installed vapor injectors, for example inlets 5. A further option is the installation, in this region, of a vapor-injection ring having inlets or holes. The injection of vapor via said inlets, or ring, prevents the entry of the charge into the upper portion of the surrounding tube 1 where it would give rise to an undesirable coking of the control valve 4 and of the inner surface of the surrounding tube 1. It also contributes to a better distribution of the catalyst 15 which accumulates over the collector/distributor vessel 2.

Figure 2:
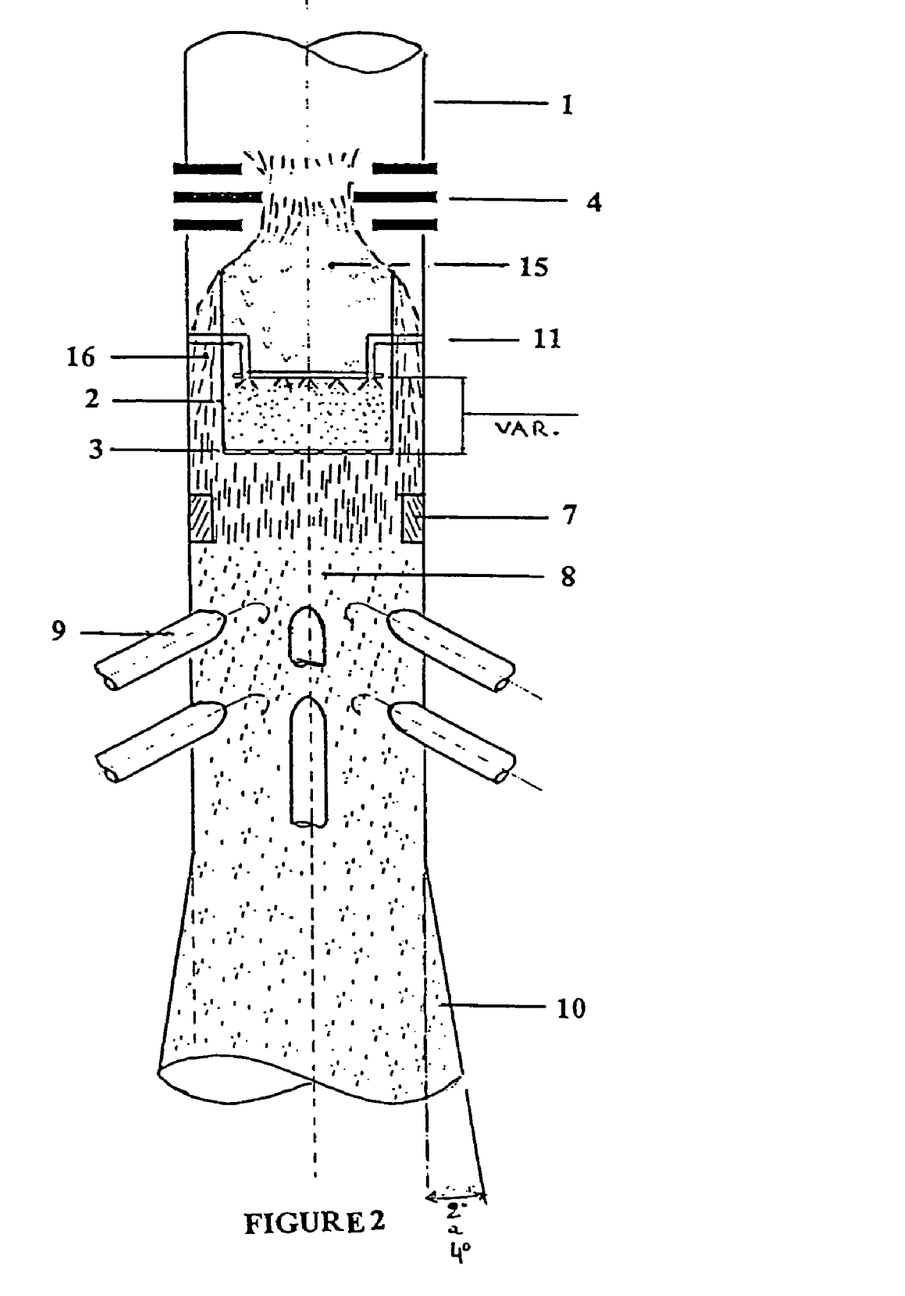
FIG. 2 shows a diagrammatic longitudinal section through a further preferred embodiment of the invention, in which it is possible to see a fluidization ring inside the distributor vessel.

FIG. 2 illustrates a further preferred embodiment, in which vapor is injected by means of a fluidization ring 11 positioned inside the collector/distributor vessel 2. This ring 11 is preferably positioned horizontally and at a distance of 20 to 40 cm from the bottom 3 of the collector/distributor vessel 2. The positioning of the fluidization ring 11 inside the collector/distributor vessel 2 prevents coke formation at the top of the vessel 2 and induces some degree of fluidization of the catalyst so as to provide, as a priority, homogenization and a better distribution of the catalyst and also assist the introduction of vapor.

Although not shown in FIGS. 1 and 2, the ideal is the simultaneous injection of vapor, both via injection inlets 9 or an injection ring, at the top of the device, below the catalyst entry valve 4, as shown in FIG. 1, and also by means of a fluidization ring 11, inside the collector/distributor vessel 2, as shown in FIG. 2.

Returning to FIG. 1, it may be seen that, below the catalyst-collector/-distributor vessel 2, over the inner surface of the surrounding tube 1, there is a preferably horizontal annular screen 7. This is an inward projection from the inner surface of the surrounding tube 1, whose cross section may be rectangular, square, triangular, trapezoidal or of any other suitable geometrical shape, with the aim of generating a centripetal component of movement over the descending annular curtain 16 of catalyst by means of a certain angular deflection. Said angle, preferably within the range up to 30° with respect to the horizontal, and in the direction of the longitudinal axis of the mixing region 8, is identical to the angle of repose of the catalyst retained on the horizontally arranged annular screen 7, on the inner surface of the surrounding tube 1 of the device of the invention, below the collector/distributor vessel 2.

Charge injectors, for example inlets 9, are installed on the walls of the surrounding tube 1 below the annular screen 7. Preferably, twelve inlets 9, or a greater or lesser number according to the best results of experiments, are distributed over the circumference of one or more cross sections of the surrounding tube 1. If the inlets 9 are mounted in the form of two or more levels, i.e. in two or more cross sections of the surrounding tube 1, there will preferably have to be an angular offset between corresponding inlets located at adjacent levels. In other words, the inlets would not be mounted vertically aligned with one another. The number of charge-injection inlets 9 depends on the diameter of the downer and on the charge being processed, (e.g. the magnitude and nature of the charge). The inlets 9 should preferably be mounted on two levels, with an angular offset defined between these two sets, in order to optimize the volume of the downer under the influence of the charge injectors. Thus, for example, in the case of 12 inlets, these would be distributed on two levels, each with 6 inlets, spaced at 60° intervals in each level. Between one level and the next, the inlets would be offset by 30°. The inlets 9 may be inclined with angles of between −30° and +30° with respect to the horizontal. Preferably, the inlets 9 are mounted with an inclination of 0° to +30°, or with a slight negative angle, injecting sprayed charge with a movement component in the direction counter to the stream of catalyst. The injection of charge under such conditions contributes to the production of an adequate mixture.

The region in the vicinity of the charge-injection inlets 9 and between those inlets 9 and the annular screen 7 is the so-called mixing region 8. In this region 8, the catalyst is intimately mixed with the heavy hydrocarbon charge.

Below the mixing region 8, the diameter of the surrounding tube 1 expands slightly, at a taper of around 0° to 4° with respect to the vertical, preferably a taper of from 2° to 4°, until the diameter of the surrounding tube 1 reaches a value close to that of the diameter of the section of the reactor where it will be connected. The selection of an angle of 0°, the range limit value, means that, depending on circumstances, the invention may be embodied without the installation of this expansion. It must be noted that the surrounding tube is constructed with a diameter which is smaller than that of the associated reactor in order to improve the conditions of homogeneous distribution of the catalyst in the cross section of said tube 1 and to facilitate the maintenance of an adequate distribution of catalyst and mixing of the catalyst with the charge during downward flow.

Figure 3:
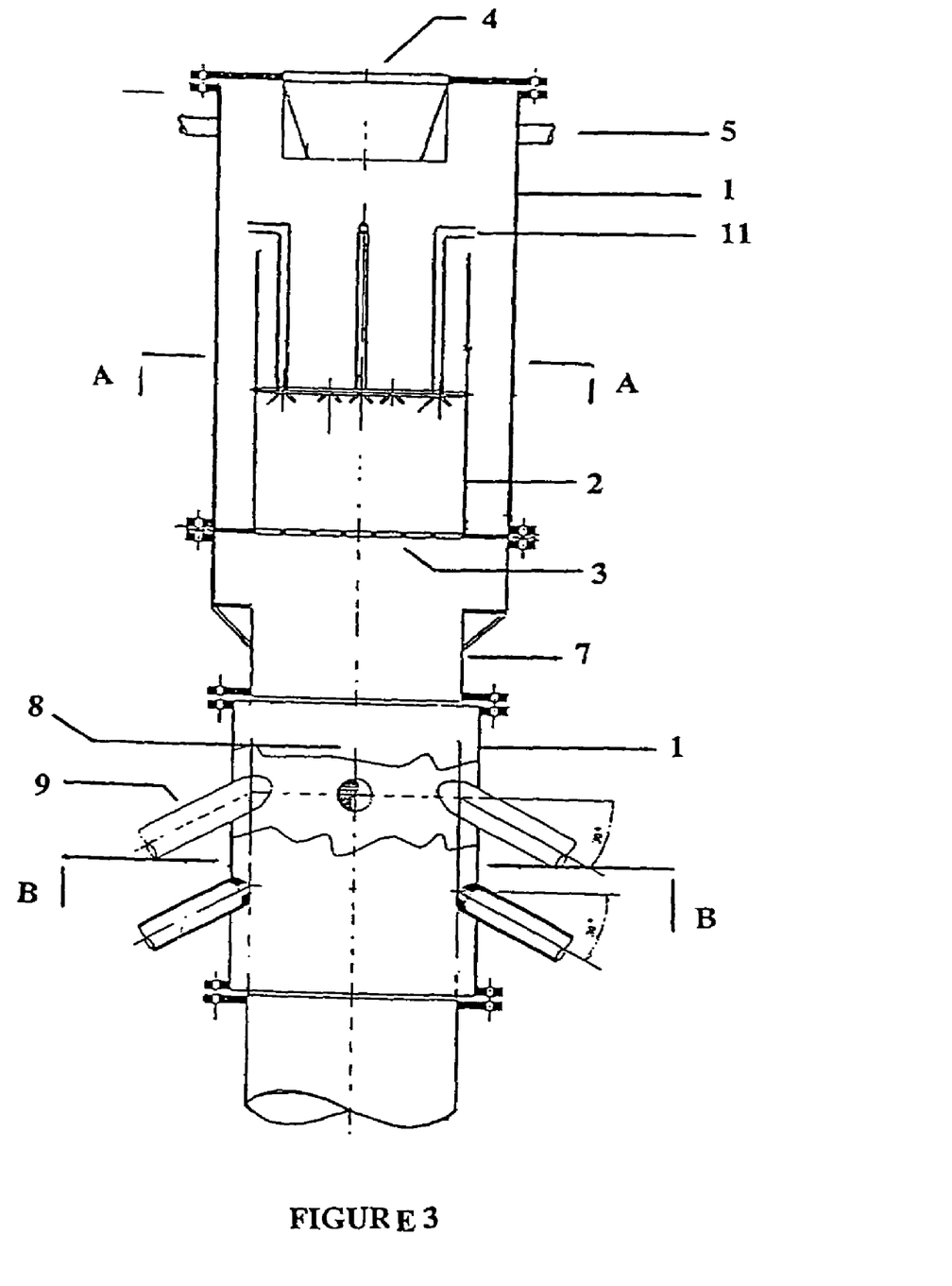
FIG. 3 shows a diagrammatic longitudinal section through an embodiment of the invention, as constructed for preliminary tests.

FIG. 3 shows a diagrammatic longitudinal section through a prototype embodiment of the invention manufactured for preliminary tests. In this case, the prototype has vapor injection at 5 below the control valve 4 as in FIG. 1, and a fluidization ring 11 may be seen positioned inside the collector/distributor vessel 2, as in FIG. 2. The principal internal components, described with reference to FIGS. 1 and 2, are retained, with the same numbering. However, the expanding lower portion is not shown.

Figure 4:
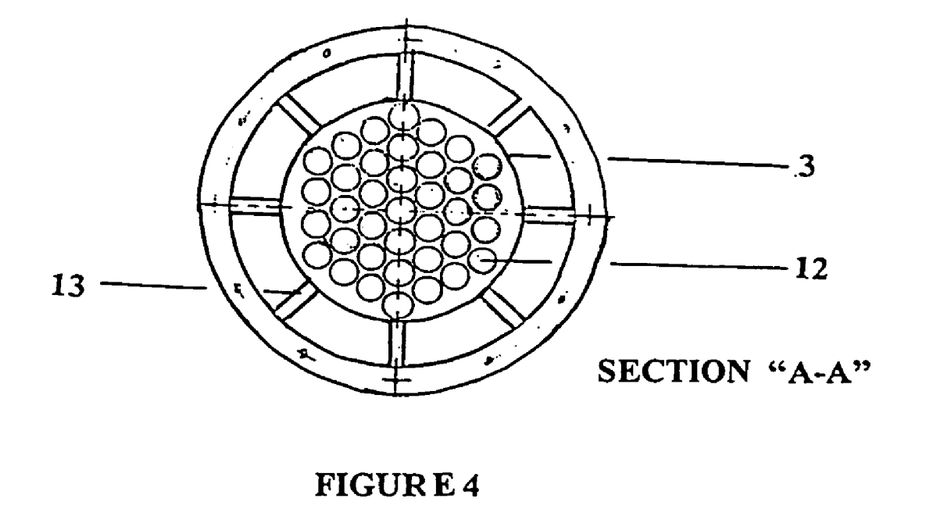
FIG. 4 shows a diagrammatic transverse section on the line "A-A" shown in FIG. 3, at the level of the cylindrical vessel.

FIG. 4 shows a transverse section ("A-A") through the prototype, at the level of the collector/distributor vessel 2. It is possible to see the orifices 12 in the bottom plate 3 and the supports 13 of the collector/distributor vessel 2. In this preferred test-embodiment the supports 13 have the form of uniformly spaced radially extending shafts connected between the surrounding tube 1 and the collector/distributor vessel 2.

Figure 5:
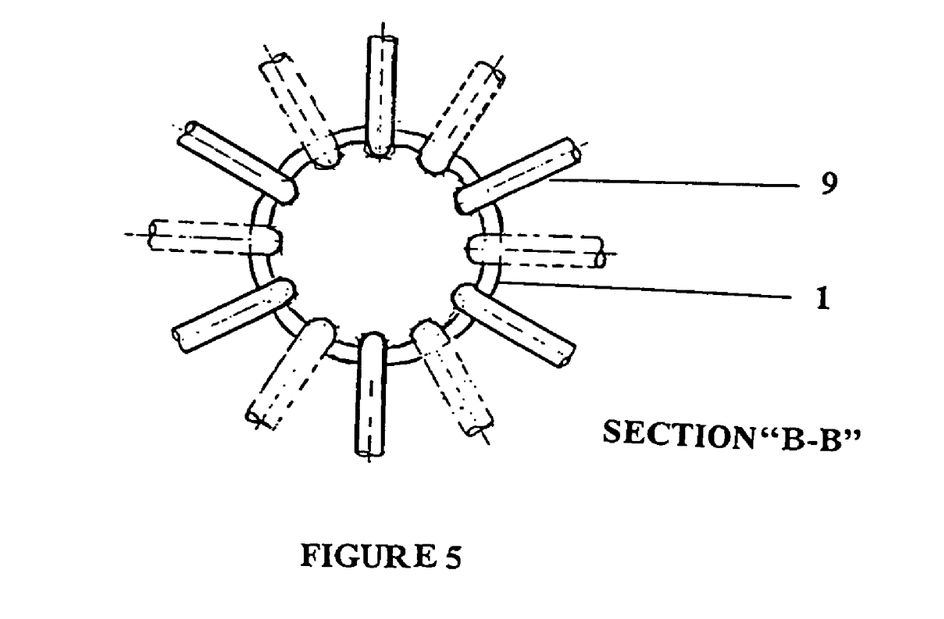
FIG. 5 shows a diagrammatic transverse section on the line "B-B" shown in FIG. 3, in the region of the charge-injection inlets.

FIG. 5 shows a further transverse section ("B-B") through the prototype, at the level of the mixing region 8, showing the injector inlets 9. In this case, there are 12 inlets, on two levels. At each level, the inlets 9 are angularly spaced by 60°, and they are offset by 30° with respect to the inlets of the other level. The inlets 9 are mounted radially, sloping upwards, forming an angle of 30° with respect to the horizontal.

As may be seen in FIGS. 1 and 2, the entry flow of catalyst 15, generally in the form of heated solid granules, is controlled, centralized and initially distributed as homogeneously as possible, by means of a control valve 4. After passing the control valve 4 and entering into the surrounding tube 1 of the multifunctional entry device of the invention, the catalyst tends to accumulate on the perforated plate 3 which forms the floor of the collector/distributor vessel 2 mounted axially and concentrically in the upper inner portion of the multifunctional entry device of the invention.

In order to prevent the formation of coke owing to the presence of hydrocarbon charge in the region of the top of the device, vapor is injected above the collector/distributor vessel 2 by means of injector inlets 5, or an injector ring.

Another option for the injection of vapor is the use of a fluidization ring 11 having injection orifices, mounted inside the collector/distributor vessel 2 as shown in FIG. 2. The fluidization ring inside the collector/distributor vessel 2 allows better distribution of the catalyst and prevents the formation of coke in the top of the device.

As mentioned above, a yet further option would be the simultaneous use of the two types of vapor injection described above, with the result that the formation of coke in the top of the device is prevented and a satisfactory distribution of the catalyst is achieved.

A portion of the stream of catalyst which does not flow through the orifices 12 in the bottom plate 3 of the collector/distributor vessel 2 flows via the annular space between said vessel 2 and the surrounding tube 1, forming a descending curtain 16.

After passing beyond the collector/distributor vessel 2, the curtain 16 of catalyst, encounters the annular screen 7 and undergoes a change in direction towards the longitudinal axis of the surrounding tube 1 of the device, where it is mixed with the stream of catalyst originating from the orifices 12 in the bottom plate 3 of the collector/distributor vessel 2. Next, the stream of catalyst enters the mixing region 8, where a hydrocarbon charge is injected through injectors 9, initiating the anticipated thermal and catalytic reactions. From the mixing region 8, the stream continues to the lower parts of the reactor; the surrounding tube 1 of the device of the invention in this path expands slightly up to the diameter of the section of the reactor to which it will be connected.

The method of the invention for supplying, distributing and intimately mixing catalyst with a hydrocarbon charge comprises the following stages: a) controlled entry of the catalyst inside the device; b) injection of vapor via inlets or a ring into the top of the device to prevent coking in the upper region of the device (alternative to or together with stage (d)); c) collection of the catalyst in a collector/distributor vessel inside the device; d) injection of vapor inside the collector/distributor vessel in order to fluidize the catalyst (alternative to or together with stage b)); production of a distributed downward flow of catalyst through orifices in the bottom of the collector/distributor vessel; f) production of a downward flow of catalyst which overflows the rim of the collector/distributor vessel, in the form of a descending annular curtain in the space between the collector/distributor vessel and the surrounding tube of the device; g) inward deflection of the flow of catalyst of an annular curtain towards the longitudinal axis of the device by means of an annular screen in order to mix it homogeneously with the flow of catalyst originating from the holes in the bottom of the collector/distributor vessel; h) injection of a hydrocarbon charge, preferably in contraflow, or slightly with the flow (at a slightly negative angle with respect to the horizontal), and its intimate mixing with the catalyst; i) flow of the mixture to the reaction regions of the associated downer reactor via a path where optionally the diameter of the surrounding tube of the device expands slightly.

The invention, as described above, offers advantageous characteristics as described below.

Use is made of a device for controlling the entry volume of catalyst 15, in the form of a preferably automatic valve 4 based on selected process parameters and installed in the entry device. In this way, the catalyst 15 may be supplied independently of the differential pressure between a mixing chamber and a reservoir of catalyst, as is customary in the state of the art. This is a desirable characteristic from the operational standpoint.

Use is made of a reduced diameter in the region 8 for mixing the catalyst with the sprayed or vaporized hydrocarbon charge, which allows a more intimate contact between the two components and, consequently, mixing under more favorable conditions.

In the case of reactor diameters above 900 mm, it is possible to operate with catalyst/charge ratio values of at least 6.0.

With ratio values of up to 6.0, the stream of catalyst is distributed uniformly over the cross section of the reactor in the form of threads with a diameter equal to that (normally of the order of 50 mm) of the holes 12 in the plate 3 of the bottom of the collector/distributor vessel 2. For values above 6.0, the flow of catalyst 15 above this ratio overflows the sides of the collector/distributor vessel 2. After passing beyond this vessel 2, the stream 16 of catalyst which overflows the upper edge of the collector/distributor vessel 2 encounters an annular screen 7 which produces in it an angular flow deflection of the order of 30° with respect to the horizontal, with a velocity component radially towards the centre of the flow section of the surrounding tube 1, the velocity component being downward and vertical. In the case of a screen 7 with a rectangular cross section, this angle is given by the profile of the column of catalyst at rest on the screen. (Known as its "angle of repose"). This same angle of deflection of the stream 16 in the form of a curtain may also be obtained by giving the cross section of the screen 7 a suitable angular profile. This effect of deflecting the stream 16 of catalyst in the form of a curtain is important in that it prevents the concentration of catalyst in the vicinity of the wall of a downer-type reactor, improving the catalyst-distribution profile, as catalyst would normally tend to concentrate in the region close to the wall. It also prevents the concentration of catalyst in the region where the injector inlets are installed, minimizing erosion of the injectors.

The hydrocarbon charge is injected in sprayed form, preferably by two sets of multiple inlets 9, at speeds above 50 m/s, preferably between 50 and 100 m/s. The inlets 9 are mounted with a positive slope with respect to the horizontal, i.e. the jets are directed against the stream of catalyst. In this way, better back mixing is obtained, allowing the occurrence of at least two contacts between the catalyst and the charge, one during the rise and the other during the fall of the mixture. Another option is the installation of the inlets with a slight negative slope (less back mixing effect).

The stream of the greater part of the catalyst through the perforated plate 3 allows a satisfactory radial distribution of the catalyst before it is bombarded by the charge. In addition, the curtain 16 of catalyst which, from a certain height has attained a radial velocity component towards the centre of the cross section of the surrounding tube 1, allows maximization of the energy present in the sprayed charge for the intimate mixing of the catalyst with the charge in the entire reaction region of the downer, causing a greater mixing-chamber effect to be obtained. This characteristic favorably differentiates the invention from curtain devices with a radial velocity component towards the wall of the reactor and from those which make use solely of the curtain stream with a radial velocity component towards the centre.

The embodiment of the invention as illustrated in FIG. 2, with the use of a fluidization ring 11 installed from 200 to 400 mm, preferably 300 mm, above the perforated plate 3, not only allows better distribution of the catalyst overflowing the side of the vessel 2, but also allows the distribution of all the catalyst only via the holes 12 in the plate 3, even in the case of catalyst/charge ratios above 8.0, depending on the degree of fluidization used.

Downstream of the mixing region 8, the diameter of the device of the invention expands slightly, for example at an angle with respect to the vertical of 0° to 4°, up to the nominal diameter of the reactor, so as to reduce segregation of the catalyst from the reagent hydrocarbon current. In one possible embodiment of the invention, the selection of an angle of 0° with respect to the vertical, the limit situation, avoids the use of said expansion portion.

The injection of vapor into the upper part of the device of the invention by means of the vapor inlets 5, shown in FIG. 1, or by means of an injector ring 11 of FIG. 2 (not shown in FIG. 1), prevents the stream of hydrocarbon from reaching that region, thereby minimizing the formation of coke and other undesirable products. This form of vapor injection may be used simultaneously with the fluidization ring 11 shown in FIG. 2.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. Multifunctional entry device for a downward flow tube reactor for supplying and distributing catalyst and mixing it with a hydrocarbon charge to be applied in the upper portion of said reactor, wherein said multifunctional device comprises:

a predominantly cylindrical surrounding tube, coupled to said downward flow tube reactor, wherein the diameter of an upper portion of said surrounding tube is smaller than the diameter of said reactor, and the diameter of a lower portion of said surrounding tube expands slightly un to the diameter of the corresponding section of said reactor;

a control valve installed in the upper portion of said surrounding tube and associated with a mechanism for redirecting a catalyst charge to the central region of the reactor;

a cylindrical catalyst collector/distributor vessel, mounted axially and longitudinally below said control valve, having a bottom wall in the form of a plate having uniformly distributed perforations, the diameter of which is smaller than the diameter of said surrounding tube;

means for injecting steam into the device, located between said control valve and said cylindrical catalyst collector/distributor vessel, installed on the walls of said surrounding tube;

deflective means, in the form of an annular screen, installed on the walls of said surrounding tube, sufficiently spaced from the bottom of said cylindrical collector/distributor vessel for deflecting a stream of catalyst overflowing the catalyst collector/distributor vessel, in the form of an annular curtain, towards the central region of the surrounding tube, in a direction towards a mixing region formed below said annular screen; and     means for injecting a hydrocarbon charge into the mixing region, said means installed on the walls of said surrounding tube and below said deflective means, said injecting means being disposed in at least two levels.

2. Multifunctional entry device according to claim 1, wherein the lower portion of the surrounding tube has a diameter which expands slightly, after the mixing region and forms an angle of 0° to 4° with the vertical plane, up to the diameter of the corresponding section of said reactor, where said multifunctional entry device will be connected.

3. Multifunctional entry device according to claim 1, wherein the control valve for controlling entry of catalyst comprises a plug-type valve.

4. Multifunctional entry device according to claim 1, wherein the control valve for controlling entry of catalyst comprises a slide-type valve, with simple displacement, associated with means for redirecting the catalyst to the central portion of the entry region.

5. Multifunctional entry device according to claim 1, wherein the control valve for controlling entry of catalyst comprises a slide valve with double actuation.

6. Multifunctional entry device according to claim 1, wherein said means for injecting steam includes an injecting ring, with one of multiple inlets and multiple holes, mounted in the surrounding tube in the region between the control means for controlling entry of catalyst and the collector/distributor vessel.

7. Multifunctional entry device according to claim 1, wherein said means for injecting steam includes a fluidization ring positioned inside the collector/distributor vessel.

8. Multifunctional entry device according to claim 1, wherein said means for injecting steam includes vapor-injecting inlets mounted in the surrounding tube, in the region between the control means for controlling entry of catalyst and the collector/distributor vessel, and also a fluidization ring positioned inside the collector/distributor vessel.

9. Multifunctional entry device according to claim 1, wherein said means for injecting steam includes a vapor-injecting ring, with multiple inlets or holes, mounted in the surrounding tube, in the region between the control means for controlling entry of catalyst and the collector/distributor vessel, and also a fluidization ring positioned inside the collector/distributor vessel.

10. Multifunctional entry device according to claim 1, wherein said injection means comprises hydrocarbon-charge injector inlets mounted in the surrounding tube, at the level of the mixing region, uniformly distributed around at least one transverse section of said tube.

11. Multifunctional entry device according to claim 10, wherein in that there are said hydrocarbon-charge injector inlets at different levels in the outer tube and in that corresponding ones of said hydrocarbon-charge injector inlets, located at adjacent levels, have an angular offset between the respective mounting locations which corresponds to a rotation of the respective mounting planes about the longitudinal axis of the tube.

12. A multifunctional entry device according to claim 10, wherein the hydrocarbon-charge injector inlets are mounted with a positive angle of from 0° to 30° with respect to the horizontal so as to have a component of motion of the injected flow against the direction of flow of the catalyst.

13. Multifunctional entry device according to claim 10, wherein the hydrocarbon-charge injector inlets are mounted with a negative angle of from 0° to −30° to the horizontal so as to have a component of movement of the injected flow along the direction of flow of the catalyst.

\* \* \* \* \*